United States Patent

Okamoto et al.

[11] Patent Number: 5,157,648
[45] Date of Patent: Oct. 20, 1992

[54] OPTICAL DISC PLAYER

[75] Inventors: Kazuyuki Okamoto, Shimogyo; Masashi Yagi, Neyagawa, both of Japan

[73] Assignee: Sanyo Electric Co., Ltd., Osaka, Japan

[21] Appl. No.: 267,481

[22] Filed: Nov. 4, 1988

[30] Foreign Application Priority Data

Nov. 6, 1987 [JP] Japan ................... 62-281425

[51] Int. Cl.⁵ .................... G11B 21/04; G11B 3/36
[52] U.S. Cl. .................... 369/75.2; 369/58; 369/258; 369/195
[58] Field of Search .............. 369/75.1, 75.2, 77.1, 369/195, 199, 187, 32, 79, 258, 58; 358/342

[56] References Cited

U.S. PATENT DOCUMENTS

| | | | |
|---|---|---|---|
| 4,098,510 | 7/1978 | Suzuki et al. | 369/75.1 |
| 4,447,900 | 5/1984 | Schatteman et al. | 369/195 X |
| 4,586,100 | 4/1986 | Howe et al. | 360/128 |
| 4,811,324 | 3/1989 | Ikedo et al. | 369/199 |
| 4,839,881 | 6/1989 | Takahara et al. | 369/195 X |
| 4,844,679 | 7/1989 | Teranishi | 369/195 X |

FOREIGN PATENT DOCUMENTS

| | | |
|---|---|---|
| 903220 | 12/1985 | Belgium. |
| 58-212629 | 12/1983 | Japan. |
| 59-157873 | 9/1984 | Japan. |
| 59-191140 | 10/1984 | Japan. |
| 60-120922 | 12/1986 | Japan. |

OTHER PUBLICATIONS

Patent Abstracts of Japan vol. 5, No. 107 (P-70) (779), Jul. 11, 1981 & JP-A-56 051 061 (Tokyo Shibaura Denki K. K.) May 8, 1981.
Patent Abstracts of Japan vol. 5, No. 142 (P-79) (814), Sep. 8, 1981 & JP-A-56 077 953 (AKAI DENKI K.K.), Jun. 26, 1981.
Patent Abstract of Japan vol. 9, No. 122 (P-359) (1845), May 28, 1985 & JP-A-60 007 643 (Fujitsu K. K.), Jan. 16, 1985.
"Combining the Technique of Laser and Digital Pioneer LV/CD Player CLD-7" Kon, Denshi Gijutsu Shuppan Co., Ltd., Apr. 1986, pp. 25-33.

*Primary Examiner*—Stuart S. Levy
*Assistant Examiner*—Joseph A. Rhoa
*Attorney, Agent, or Firm*—Armstrong, Nikaido, Marmelstein, Kubovcik & Murray

[57] ABSTRACT

A disc player for playing a first disc having data recorded on both sides thereof and also a second disc having data recorded on only one side thereof has disc drive means loadable with one of the first and second discs selectively. Whether the disc loaded on the drive means is the first disc or the second disc is detected from the data read by pickup means. When the second disc is detected, the pickup means is positioned for the data recording side of the second disc automatically so as to reproduce signals therefrom. Accordingly, even if the second disc is loaded with the disc side oriented erroneously, the data can be read from the recording side at all times.

2 Claims, 7 Drawing Sheets

5,157,648

OPTICAL DISC PLAYER

FIELD OF THE INVENTION

The present invention relates to optical disc players for discs having recorded thereon data in the form of audio signals, video signals or the like for optically reading the data from the disc, and more particularly to such a player adapted for the reproduction of data from two kinds of discs, i.e., one having data recorded on only one side thereof, and the other having data recorded on both sides thereof.

BACKGROUND OF THE INVENTION

Optical disc are in wide use which include compact discs having a diameter of 12 cm with audio signals recorded thereon (digital audio discs, hereinafter referred to as "CD"), video compact discs 12 cm in diameter and having recorded thereon audio signals and video signals as superposed on the signals (hereinafter referred to as "CDV"), and laser vision discs 20 cm or 30 cm in diameter and having recorded thereon audio signals and video signals as superposed on the signals (hereinafter referred to as "LD"). With CD and CVD, signals are recorded on only one side of the disc. LDs with a diameter of 20 cm include those having signals recorded on only one side thereof (hereinafter referred to as "LDS"), and those having signals recorded on both sides. Signals are recorded on both sides of LDs with a diameter of 30 cm.

In recent years, so-called convertible players have been proposed for playing these different kinds of discs with a single pickup (Unexamined Japanese Patent Publication SHO 58-212629, and "Television Techniques," published by Denshi Gijutsu Shuppan Co., Ltd., April 1986, pp. 25-33).

With such convertible players, the size of the disc clamped on the turntable is first detected by an optical sensor, and the disc thus identified is played by controlling the player according to the method specified for the disc, as by setting the disc drive motor to the specified speed.

The conventional convertible player is so adapted that the pickup reciprocatingly moves on the lower side of the disc in rotation to scan only the lower side of the disc, so that the disc, such as CD or CDV, with data recorded on only one side thereof must be placed on the turntable with the data recording side down. If the disc is placed with the other side down, the player is unable to read the data.

In such a case, it is necessary for the user to discharge the disc from the player, then turn the disc upside down and load the disc into the player again. This procedure is very cumbersome.

SUMMARY OF THE INVENTION

An object of the present invention is to provide a disc player which is adapted to detect whether the disc to be played is a first disc having data recorded on both sides thereof or a second disc having data recorded on only one side thereof and in which when the second disc is to be played, the pickup is positionable for the data recording side of the disc to read the data therefrom at all times regardless of whether the data recording side is upper side or lower side.

Another object of the invention is to provide a disc player which is so adapted that when the disc to be played is the first disc, the pickup starts to read the data from the specified data recording side of the first disc.

Another object of the invention is to provide a disc player which is usable for different kinds of discs having varying diameters and adapted to identify the disc to be played to control for the identified disc the movement of the pickup radially of the disc.

The disc player of the present invention comprises disc drive means to be loaded with either one of first and second discs selectively, pickup means capable of reading data from both sides of the first or second disc loaded on the disc drive means, disc identifying means for detecting whether the disc loaded on the disc drive means is the first disc or second disc, and reproduction side selecting means for positioning the pickup means for the data recording side of the second disc for the reproduction of signals therefrom when the disc loaded is identified as the second disc.

When a disc having data recorded on only one side thereof is loaded in the disc player with the disc side erroneously oriented, the pickup means can be always positioned for the data recording side for the reproduction of signals therefrom. Accordingly, the disc need not be withdrawn and turned upside down and can be handled with greater ease.

DETAILED DESCRIPTION OF THE INVENTION

Basic Construction

Figure 1:
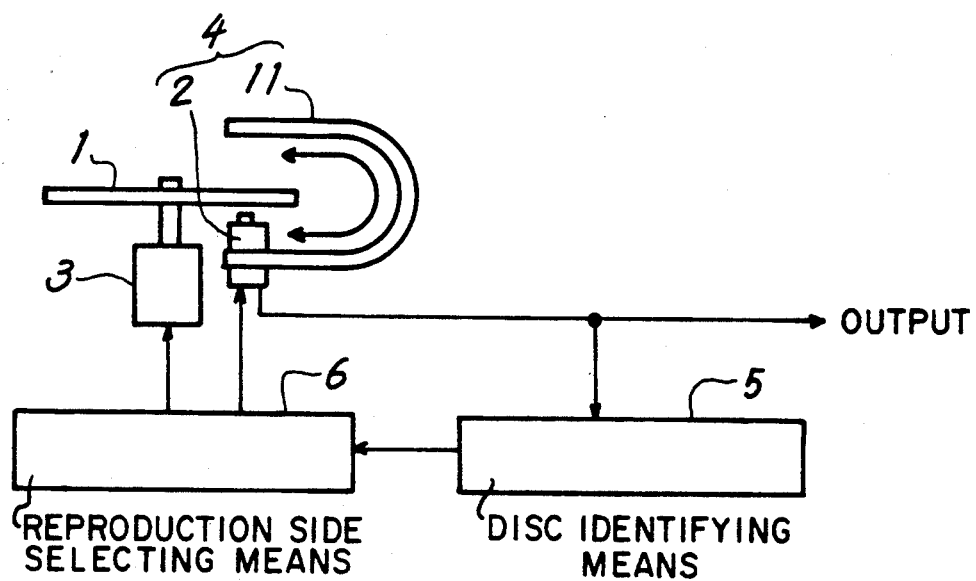
FIG. 1 is a block diagram showing the characteristic arrangement included in a disc player embodying the invention.

FIG. 1 shows the basic construction of a disc player embodying the invention. Pickup means 4 for reproducing signals from a disc 1 loaded on disc drive means 3 comprises an optical pickup 2 and a pickup transport assembly 11 having U-shaped guide rails.

The data read by the pickup 2 is sent to disc identifying means 5, which detects from the read data whether the disc 1 is a first disc having data recorded on both sides thereof or a second disc having data recorded on only one side thereof. The result of detection or identification is forwarded to reproduction side selecting means 6, which controls the operation of the disc drive means 3 and the pickup means 4. When the disc 1 is identified as the second disc, the pickup 2 is set for the data recording side of the second disc for the reproduction of signals.

The optical disc player embodying the invention will be described further with reference to the drawings.

Overall Construction

Figure 2:
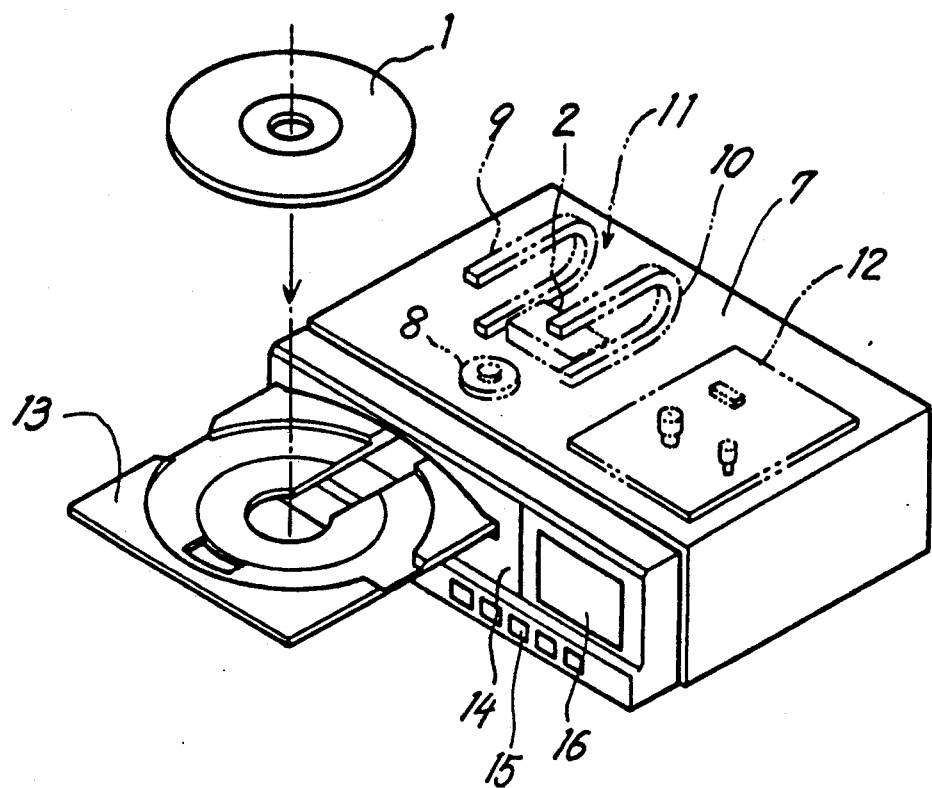
FIG. 2 is a perspective view showing the appearance of the disc player.
Figure 3:
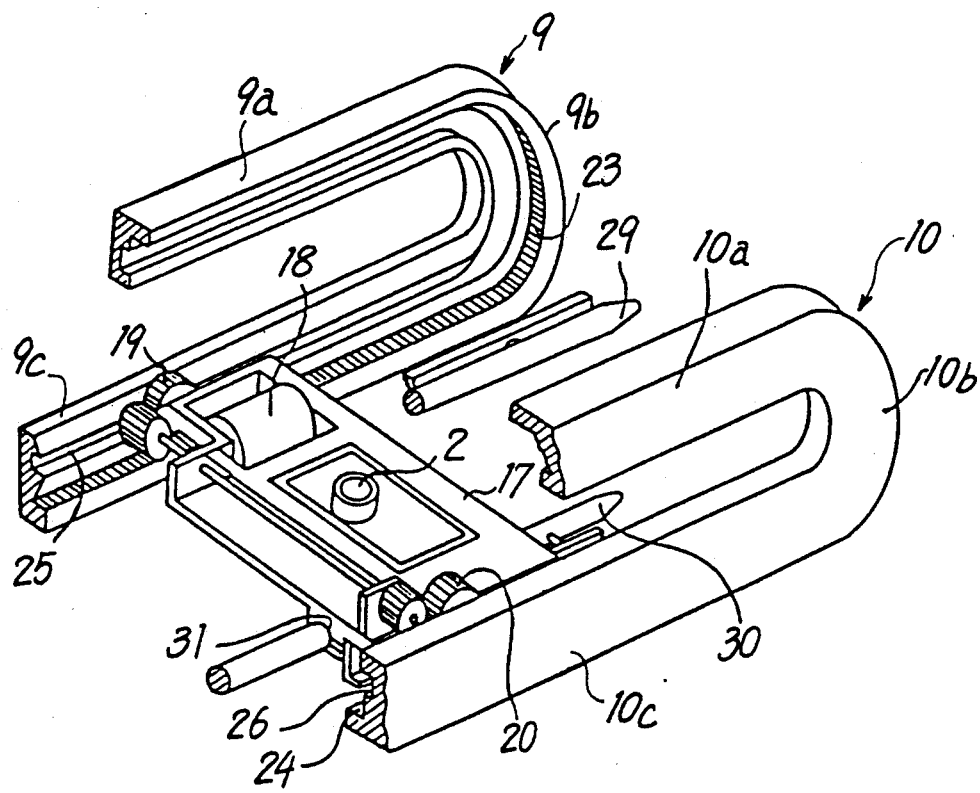
FIG. 3 is a perspective view partly broken away and showing a pickup transport assembly.
Figure 4:
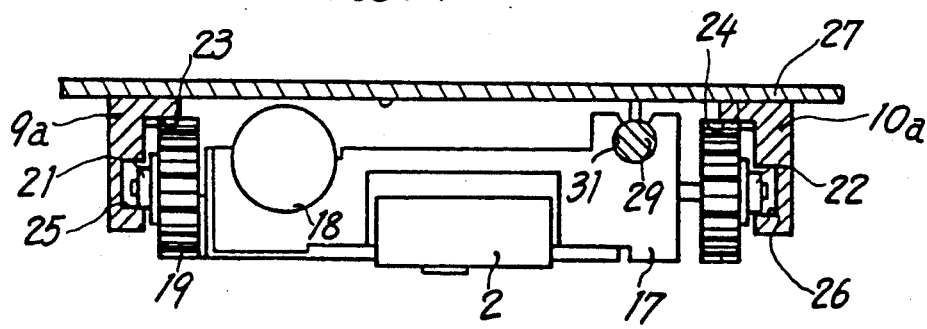
FIG. 4 is a view in vertical section showing the upper half of the pickup transport assembly.
Figure 5:
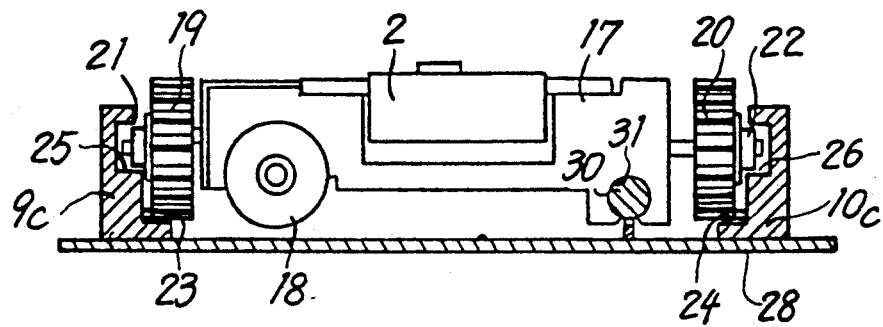
FIG. 5 is a view in vertical section showing the lower half of the pickup transport assembly.

FIG. 2 shows the appearance of the disc player. A cabinet 7 houses a turntable 8 for drivingly rotating the disc 1, the pickup transport assembly 11 for guiding the movement of the pickup 2 along a pair of U-shaped guide rails 9, 10, and a circuit board 12 carrying an electric circuit which comprises the above-mentioned disc identifying means 5, the reproduction side selecting means, etc.

A disc tray 13 for placing the disc 1 thereon is provided at an opening formed in a front panel 14 and is movable into or out of the opening. The front panel 14 is provided with a plurality of operation keys 15 and an LED display panel 16 for indicating the position of the pickup 2.

Figure 6:
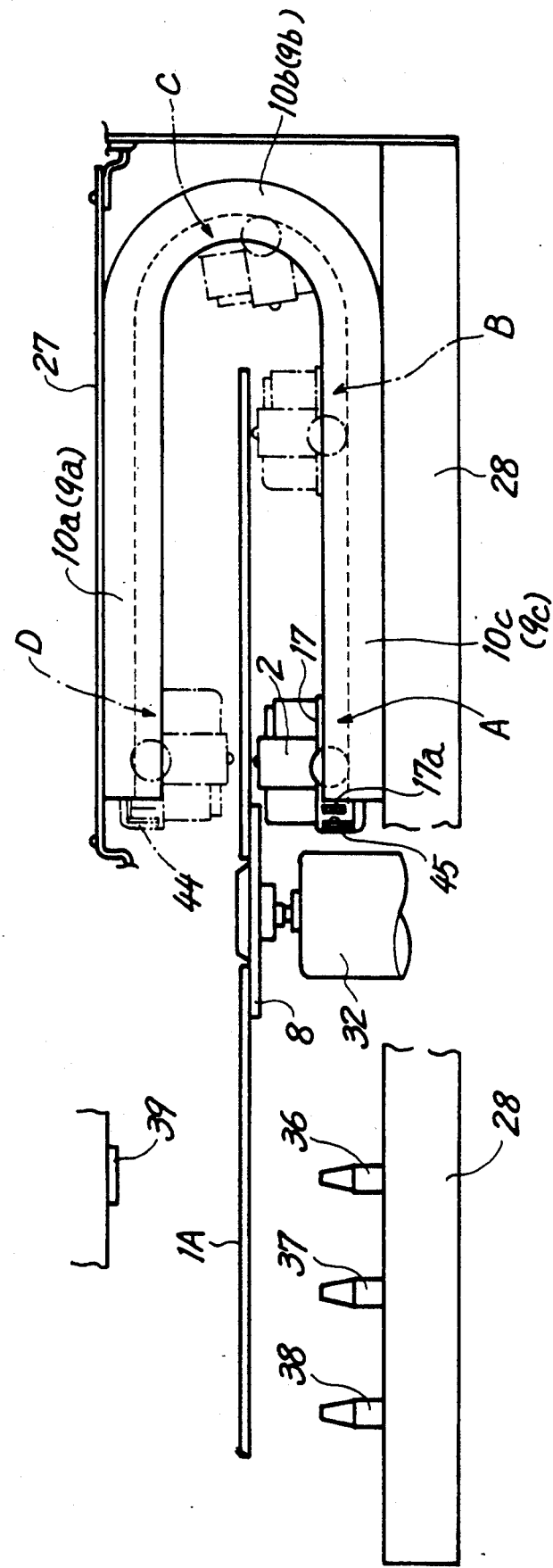
FIG. 6 is a side elevation showing the pickup transport assembly as loaded with a disc of large diameter.

The player is adapted for use with an LD (first disc) 30 cm or 20 cm in diameter and having data recorded on both sides thereof from inner periphery to outer periphery, or with CD 12 cm in diameter and having data recorded on only one side thereof from inner periphery to outer periphery. When one of the discs is placed on the disc tray 13 and loaded into the player along with the tray 13, the disc is automatically chucked on the turntable 8 and rotated with the turntable 8 by a spindle motor 32 as shown in FIG. 6.

Figure 9:
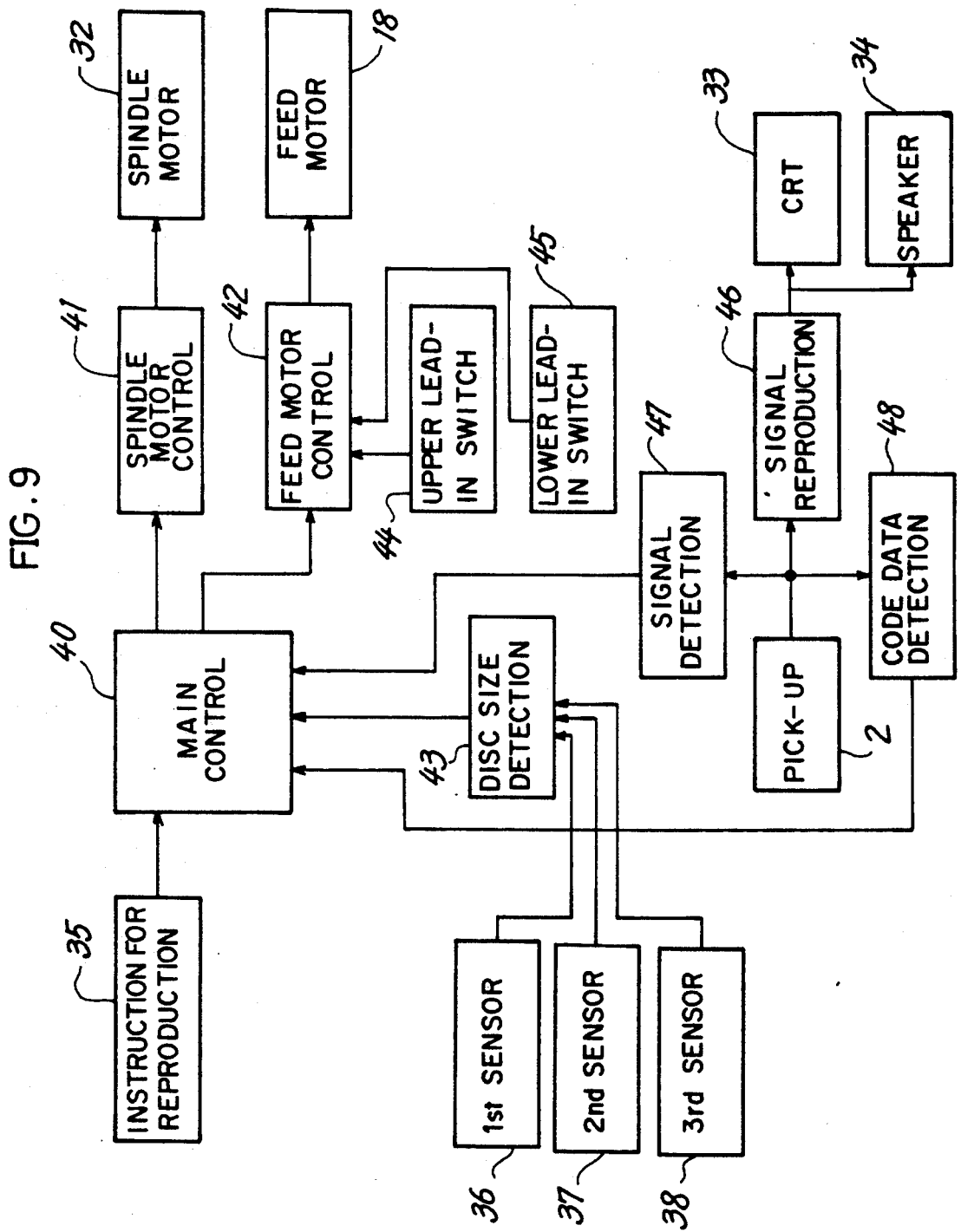
FIG. 9 is a block diagram showing the overall construction of the disc player.

The disc player has connected thereto external output units, i.e. a CRT (indicated at 33 in FIG. 9) and a speaker (at 34 in FIG. 9).

Pickup Means

As is already known, the pickup 2 comprises a semiconductor laser, an optical system including an objective lens, transducer for converting an optical signal to an electric signal, etc. and is mounted on a support base 17 as seen in FIGS. 3 to 7. The support base 17 is provided on its respective sides with a pair of pinions 19, 20 drivingly rotatable by a feed motor 18 and a pair of guide rollers 21, 22.

The guide rails 9, 10 comprise upper straight portions 9a, 10a extending along the upper side of the disc positioned in place, lower straight portions 9c, 10c extending along the lower side of the disc, and circular-arc connecting portions 9b, 10b interconnecting the respective pairs of the straight portions, respectively. Each guide rail is U-shaped in its entirety. The guide rails 9, 10 are fixed to an upper chassis 27 and a lower chassis 28. The guide rails 9, 10 are respectively formed in the inner side with racks 23, 24 meshing with the pinions 19, 20, and guide grooves 25, 26 extending along the racks for the guide rollers 21, 22 to fit in.

The upper and lower chassis 27, 28 are respectively provided with a pair of guide poles 29, 30 extending in parallel to the respective straight portions 10a, 10c of the guide rail 10. The pickup support base 17 is formed in its bottom side with a guide bore 31 for the guide poles 29, 30 to fit in.

The feed motor 18, when driven, drives the support base 17 on the guide rails 9, 10. During travel on the lower straight portions 9c, 10c, the support base 17 is guided straight by the guide pole fitting in the guide bore 31, whereby the lower side of the disc 1 is scanned. During travel on the upper straight portions 9a, 10a, the support base 17 is guided along straight by the guide pole 29 fitting in the bore 31, whereby the upper side of the disc 1 is scanned. The lower and upper sides of the disc can be scanned in succession by the travel of the base 17 along the connecting portions 9b, 10b of the guide rails.

As shown in FIG. 6, the guide rail straight portions 10a, 10c are provided with an upper lead-in switch 44 and a lower lead-in switch 45, respectively, at their ends close to the disc inner periphery. The pickup support base 17 has a lug 17a for actuating the switches 44, 45.

Disc Size Detecting Means

Figure 7:
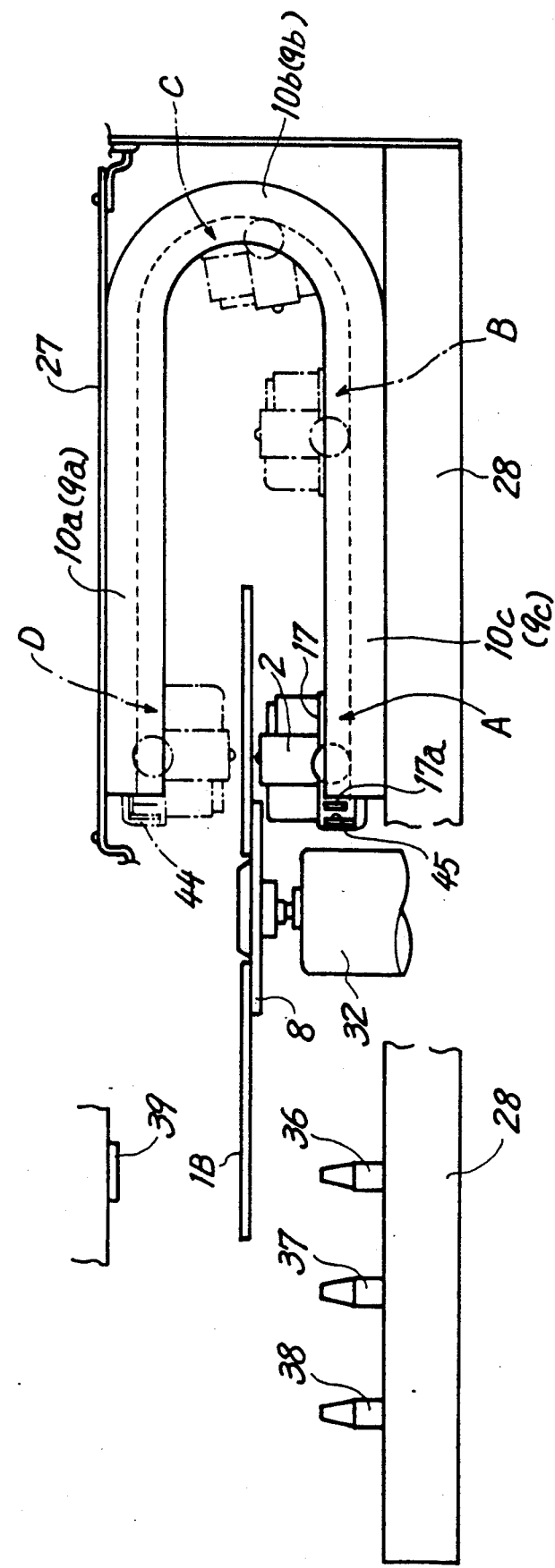
FIG. 7 is a side elevation showing the pickup transport assembly as loaded with a disc of small diameter.

FIG. 6 shows an LD 1A having a diameter of 30 cm and held on the turntable 8, and FIG. 7 shows a CD 1B having a diameter of 12 cm and held on the turntable 8.

With reference to FIGS. 6 and 7, first to third optical sensors 36, 37 and 38, such as photodiodes, are arranged under the disc radially thereof, and an LED 39 is provided above the disc.

When the LD 1A with a diameter of 30 cm is chucked on the turntable 8 as seen in FIG. 6, the light from the LED 39 is blocked by the disc, failing to impinge on the first to third sensors 36, 37 and 38, which therefore produce no output. This indicates that the disc on the turntable is LD. On the other hand, when the CD 1B, 12 cm in diameter, is on the turntable as seen in FIG. 7, the second and third sensors 37 and 38 receive the light from the LED 39, but the light to be incident on the first sensor 36 only is blocked by the disc. This indicates that the disc on the turntable is CD. The second sensor 37 serves to detect an LD with a diameter of 20 cm.

Also usable for detecting the size of discs is a photoreflector comprising an absence sensor and an LED in combination adapted to detect the light reflected from the disc.

Signal Format

Figure 8:
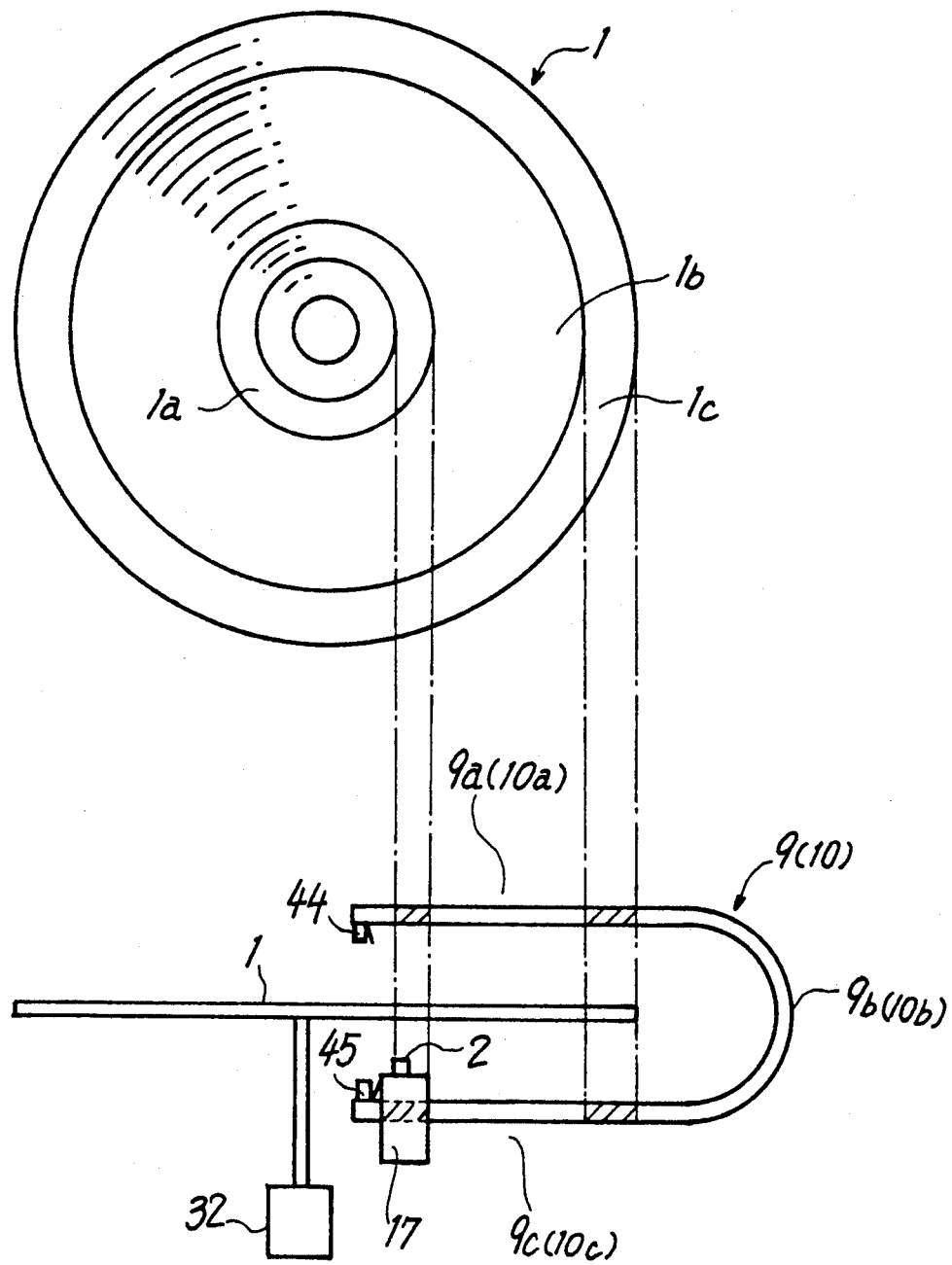
FIG. 8 is a diagram showing the relationship between the signal recording side of a disc and the position of a pickup.

With reference to FIG. 8, the signal recording side of the disc 1 has three areas: a lead-in area 1a along the inner periphery of the disc, a lead-out area 1c at the outer periphery of the disc, and a program area 1b between the two areas. The lead-in area 1a has recorded therein a lead-in signal designating the data recording start position. The lead-out area 1c has recorded therein a lead-out signal designating the data recording completion position.

When the support base 17 moves along the guide rails 9 and 10 across the hatched areas shown, the pickup reads the lead-in signal and the lead-out signal on the disc side.

The program area 1b has recorded therein from inner periphery to outer periphery audio signals or superposed video and audio signals, and various items of code data as will be described below.

The code data on the CD includes a 24-bit frame synchronizing signal, 8-bit subcode, etc. Further the code data on the LD includes a chapter number indicating a division in the program, side data indicating whether the signal recording side is A side or B side, etc.

Control System

FIG. 9 shows a control system for controlling the spindle motor 32 and the feed motor 18 to read signals from the disc and produce an output from the CRT 33 and/or the speaker 34 from the signals read.

The operation keys on the front panel provide reproduction instructing means 35 having an output terminal connected to a main control circuit 40 comprising a microcomputer. The main control circuit 40 has output terminals connected to a spindle motor control circuit 41 and a feed motor control circuit 42 for controlling the spindle motor 32 and the feed motor 18, respectively. The feed motor control circuit 42 has connected thereto the output terminals of the upper lead-in switch 44 and the lower lead-in switch 45.

The first to third sensors 36, 37 and 38 have their output terminals connected to a disc size detecting circuit 43 for detecting whether the disc held on the turntable is CD with a diameter of 12 cm, LD with a diameter of 20 cm or LD with a diameter of 30 cm as already stated. The signal identifying the disc is sent to the main control circuit 40.

The output terminal of the pickup 2 is connected to the CRT 33 and the speaker 34 via a signal reproduction circuit 46, to a signal detecting circuit 47 for detecting whether a signal representing the signal format of the disc concerned is reproduced, and to a code data detecting circuit 48 for detecting the code data. The signal detecting circuit 47 and the code data detecting circuit 48 have their output terminals connected to the main control circuit 40.

The main control circuit 40, the signal detecting circuit 47 and the code data detecting circuit 48 constitute the disc identifying means 5 and the reproduction side selecting means 6 shown in FIG. 1 and already described.

The disc size identifying circuit 43, the signal detecting circuit 47 and the code data detecting circuit 48 can of course be provided along with the main control circuit 40 by a one-chip microcomputer.

Control of Movement of Pickup

The movement of the pickup 2 is controlled according to the size of the disc to be played and the orientation of the disc (face up or down) on the turntable 8 as will be described below.

When a disc is chucked on the turntable 8, the disc size detecting circuit 43 detects from the output of the first to third sensors 36, 37 and 38 which of LD with a diameter of 30 cm, LD (or LDS) with a diameter or 20 cm and CD (or CDV) with a diameter of 12 cm the disc on the turntable is. The result of detection is fed to the main control circuit 40.

Consequently, signals can be reproduced from the disc of particular size on the turntable.

When the support base 17 is in the position A shown in FIG. 6, i.e. at the front ends of the lower straight portions 9c, 10c, with one of LD, LDS, CD and CDV held on the turntable 8, thereby positioning the pickup 2 in its initial state opposed to the lead-in area of the disc lower side at its innermost peripheral portion, a reproduction instruction is given by the reproduction instructing means 35, whereupon the instruction is fed to the main control circuit 40, which in turn delivers a control signal to the spindle motor control circuit 41 and the feed motor control circuit 42 for starting reproduction.

In response to the control signal, the spindle motor control circuit 41 rotates the spindle motor 32 forward, while the feed motor control circuit 42 drives the feed motor 18 at a low speed. Consequently, the support base 17 moves along the lower straight portions 9c, 10c at a specified speed toward the outer periphery of the disc, permitting the pickup 2 to read a signal from the disc lower side.

The signal read by the pickup 2 is fed to the signal detecting circuit 47, which checks which specified format of LD, LDS, CD and CDV the signal is in conformity with. The result is fed to the main control circuit 40.

While the control system operates as above commonly for all discs regardless of the size or orientation thereof, the system operates differently for different sizes of discs and different sides thereof as will be described below.

(1) In the case where the disc is CD or CDV, with data recorded on the lower side thereof In this case, based on the result of detection by the disc size detecting circuit 43, the system starts controlling the spindle motor 32 according to a CD signal reproduction method. The signal read by the pickup 2 is the proper single recorded on CD or CDV, so that regular control is effected. The signal detecting circuit 47 detects that the normal signal is being read out.

Consequently, the pickup 2 reads data from the disc lower side from its inner periphery to the lead-out area at the outermost peripheral portion of the disc in the specified manner. The read signals are reproduced from the CRT 33 and/or the speaker 34 via the signal reproduction circuit 46.

(2) In the case where the disc is CD or CDV, with data recorded on the upper side thereof.

In this case, as in the above case, the system starts controlling the spindle motor 32 according to the CD signal reproduction method. During the subsequent period until a specified time interval (e.g. 10 sec) elapses, the signal detecting circuit 47 continuously checks whether the proper signal is read by the pickup 2.

Since the disc lower side is not the data recording side in this case, no proper signal is read despite the lapse of the specified time interval. This is detected by the signal detecting circuit 47, whereupon the main control circuit 40 functions to reversely drive the spindle motor 32 and drives the feed motor 18 at a high speed. As a result, the support base 17 is inverted after passing the broken-line positions B and C shown in FIG. 7 and thereafter travels along the upper straight portions 9a, 10a toward the disc inner periphery. Upon reaching a position D, the support base 17 pushes the upper lead-in switch 44 at the forward ends of the portions 9a, 10a to turn on the switch.

Simultaneously with the actuation of the upper lead-in switch 44, the feed motor 18 is brought into reverse high-speed rotation. Further the control circuit 41 starts controlling the spindle motor 32 according to the CD signal reproduction method. Consequently, the pickup 2 reproduces signals from the disc upper side from its inner periphery to the lead-out area. The reproduced signals are delivered from the CRT 33 and/or the speaker 34.

(3) In the case where the disc is 30-cm or 20-cm LD, with A side down and B side up In this case, the control system controls the spindle motor 32 according to an LD reproduction method to start reproducing signals from the disc lower side first. Subsequently, the code data detecting circuit 48 detects code data inserted in the vertical blanking period of the signal read by the pickup 2, and the side data included in the code data indicates that the signal reproduction side is A side.

When the lead-out signal of A side is read on completion of signal reproduction from the disc lower side, the system reversely drives the spindle motor 32 and drives the feed motor 18 at a high speed. Consequently, the support base 17 is inverted upon passing the broken-line position C in FIG. 6 and further moves along the upper straight portions 9a, 10a toward the disc inner periphery. Upon thereafter reaching the position D, the support base 17 turns on the upper lead-in switch 44, whereupon the feed motor 18 is brought into reverse low-speed rotation, and the system starts controlling the spindle motor 32 according to the LD reproduction method. The pickup thereafter reproduces signals from the disc upper side until it reaches the lead-out area. The data afforded by the reproduced signals is displayed on the CRT 33 and also released from the speaker 34.

(4) In the case where the disc is 30-cm or 20-cm LD, with B side down and A side up In this case, as in the above case, the system starts controlling the spindle motor 32 according to the LD reproduction method. Subsequently, the code data detecting circuit 48 detects the code data inserted in the vertical blanking period of the signal read by the pickup 2, and the side data included in the code data indicates that the signal reproduction side is not A side, whereupon the feed motor 18 is brought into high-speed rotation. Without reproducing signals from the disc lower side, the support base 17 passes the positions B and C shown in FIG. 6, is inverted, and thereafter travels along the upper straight portions 9a, 10a toward the disc inner periphery. Upon reaching the position D, the support base 17 turns on the upper lead-in switch 44.

Upon the actuation of the switch 44, the spindle motor 32 is controlled according to the LD reproduction method, and the feed motor 18 is brought into reverse low-speed rotation, causing the support base 17 to move toward the disc outer periphery at the specified speed, whereby signals are reproduced from the disc upper side (A side) until the pickup 2 reaches the lead-out area.

When the lead-out signal is thereafter detected, the feed motor 18 is brought into high-speed rotation, and the spindle motor 32 is reversely driven again. Consequently, the support base 17 is inverted upon passing the position C in FIG. 6 and further travels along the lower straight portions 9c, 10c toward the disc inner periphery. Upon reaching the position A, the support base 17 turns on the lower lead-in switch 45, whereupon the feed motor 18 is brought into reverse low-speed rotation, and the spindle motor 32 is controlled according to the LD reproduction method.

The support base 17 therefore travels along the lower straight portions 9c, 10c toward the disc outer periphery, causing the pickup to reproduce signals from the disc lower side (B side).

The operation for LDS, which is the same as for CD, will not be described.

Figure 10:
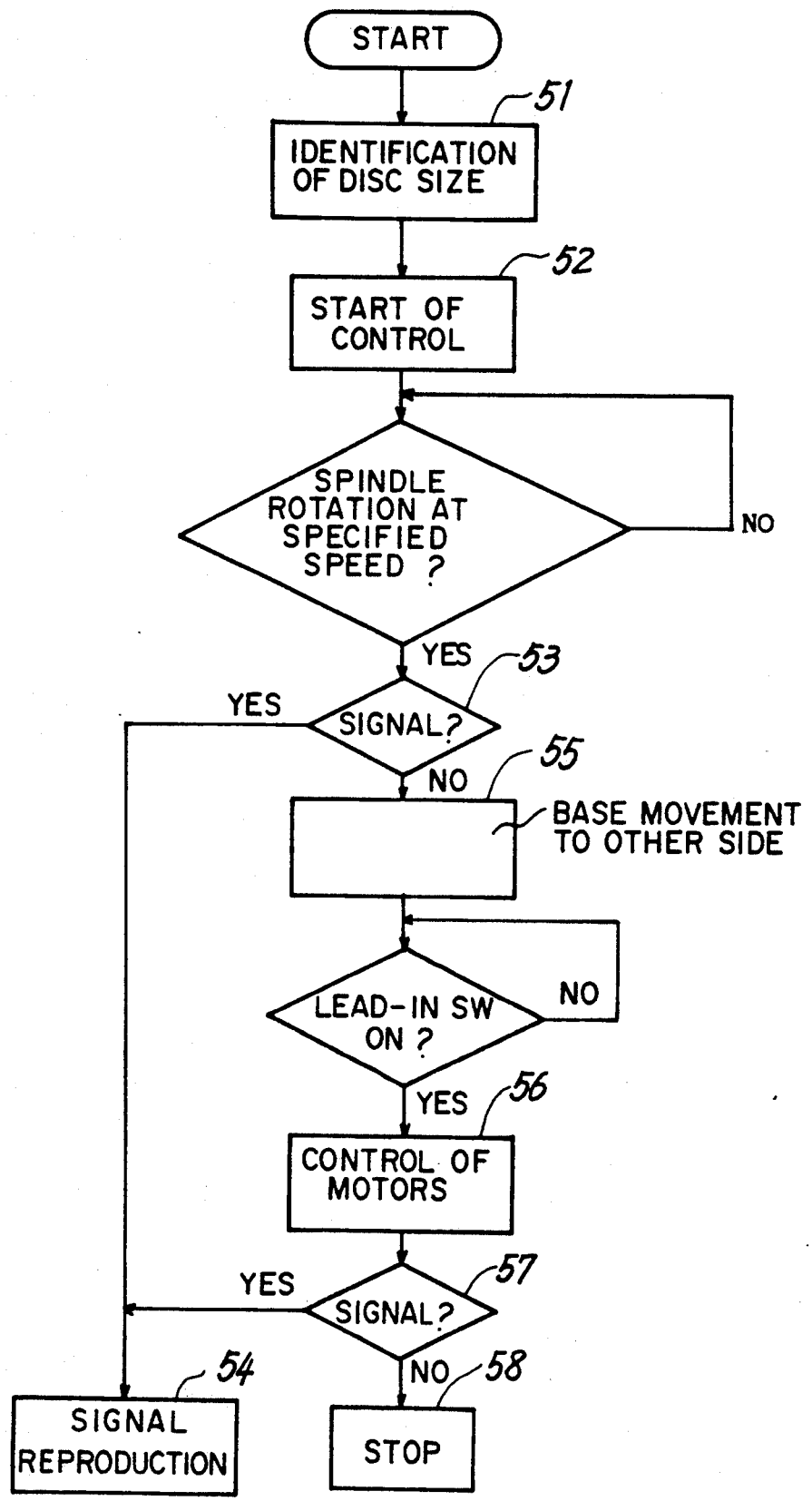
FIG. 10 is a flow chart showing the main operation of the disc player.

FIG. 10 is a flow chart showing the above operation.

First, the disc placed on the turntable is identified as at 51 according to the size, and the spindle motor is controlled as at 52 according to the size detected. After the spindle motor thereafter reaches the specified speed of rotation, the signal detecting circuit 47 is checked (53) as to whether the signal read is the proper one. If the answer is affirmative, the pickup continues reproduction of signals as at 54. When the answer is negative, the support base is moved to the other side of the disc as at 55. Upon the actuation of the lead-in switch, the speed of the feed motor and the spindle motor is controlled as at 56 for signal reproduction. An inquiry (57) is thereafter made as to whether the proper signal is read by the pickup. When the answer is affirmative, the pickup continues signal reproduction as at 54. If the answer is negative, that is, when the normal signal is read from neither of the sides of the disc, the support base is stopped as at 58. When the disc is found to be neither CD nor LD in step 51, the support base is stopped at its initial position (not shown).

According to the invention described above, when the user places a disc on the turntable with the disc side oriented in error, the orientation of the disc can be automatically detected, such that when the disc has data recorded on only one side thereof, the pickup is automatically transported to the data recording side for signal reproduction. This eliminates the need to withdraw the disc and turn the disc upside down, rendering the disc easy to handle.

The drawings and the above embodiment are given only for illustrating the present invention and should not be construed as limiting the invention defined in the appended claims or restricting the scope of the invention.

The construction of the present player is not limited to the foregoing embodiment but can of course be modified variously by one skilled in the art without departing from the scope of the invention as defined in the claims.

What is claimed is:

1. An optical disc player for optically reading data from a first disc having data recorded on both sides thereof and from a second disc having data recorded on only one side thereof, the player comprising:
    disc drive means for selectively receiving at least one of the first disc and the second disc;
    pickup means being able to access to a surface of one of the first disc and the second disc loaded on the disc drive means, said pickup means including a pickup member and a guide means for guiding said pickup member around one of the first disc and the second disc; and
    reproduction side selecting means for positioning the pickup member along the guide means in order for the data recording side of the second disc to cause the pickup member to reproduce signals therefrom when the loaded disc is identified as the second disc having the data recorded on only one side by controlling the movement of the disc drive means and the pickup means according to a resulting reproduced signal from the pickup member, the orientation and position of the disc drive means being unchanged with respect to a chassis before and after positioning the pickup member along the guide means, wherein the pickup member comprises a single optical pickup and wherein the guide means is a pickup transport assembly having a pair of U-shaped guide rails, each of the guide rails including a pair of straight portions for moving the pickup along the disc in radial direction of the disc and a circular-arc connecting portion interconnecting the straight portions, and when the disc loaded on the disc drive means is identified as the second disc, the pickup transport assembly is controlled according to the resulting identification signal by the pickup means to move the pickup to the data recording side of the second disc.

2. A disc player as defined in claim 1 further comprising code data detecting means for reading side data from the disc, and when the disc loaded on the disc drive means is identified as the first disc, the pickup transport assembly is controlled according to the side data read by the code data detecting means to set the pickup in position to start reading data from a specified signal recording side.

* * * * *